(12) United States Patent
Jo et al.

(10) Patent No.: US 12,442,536 B2
(45) Date of Patent: Oct. 14, 2025

(54) OVEN AND METHOD OF CONTROLLING THE SAME

(71) Applicant: LG Electronics Inc., Seoul (KR)

(72) Inventors: Hyunsu Jo, Seoul (KR); Sangheon Choi, Seoul (KR); Go Eun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 773 days.

(21) Appl. No.: 17/573,097

(22) Filed: Jan. 11, 2022

(65) Prior Publication Data

US 2022/0221156 A1 Jul. 14, 2022

(30) Foreign Application Priority Data

Jan. 11, 2021 (KR) .................. 10-2021-0003118

(51) Int. Cl.
*F24C 7/08* (2006.01)
*A23L 5/10* (2016.01)
*F24C 7/06* (2006.01)
*F24C 15/32* (2006.01)

(52) U.S. Cl.
CPC .............. *F24C 7/085* (2013.01); *A23L 5/15* (2016.08); *A23L 5/17* (2016.08); *F24C 7/067* (2013.01); *F24C 15/322* (2013.01); *A23V 2002/00* (2013.01)

(58) Field of Classification Search
CPC ...... A23L 5/15; A23L 5/17; F24C 7/08; F24C 7/085; F24C 7/067
See application file for complete search history.

(56) References Cited

U.S. PATENT DOCUMENTS

| 4,051,347 | A | 9/1977 | Rohrl et al. |
| 10,383,182 | B2 | 8/2019 | Vainionpää |
| 10,561,277 | B1 | 2/2020 | Swayne et al. |
| 2016/0102869 | A1* | 4/2016 | Johnson ............... F24C 15/322 |
| | | | 219/400 |
| 2020/0053842 | A1* | 2/2020 | Jeon .................... H05B 6/6473 |
| 2020/0229639 | A1* | 7/2020 | Swayne ............. A47J 37/0641 |
| 2021/0251421 | A1 | 8/2021 | Swayne et al. |
| 2022/0163214 | A1* | 5/2022 | Shinohara ............. G01K 1/024 |

FOREIGN PATENT DOCUMENTS

| DE | 292367 | 8/1991 |
| EP | 1767860 | 3/2007 |

OTHER PUBLICATIONS

Extended European Search Report in European Appln. No. 22150707.2, dated Jun. 27, 2022, 8 pages.

* cited by examiner

*Primary Examiner* — Thien S Tran
(74) *Attorney, Agent, or Firm* — Fish & Richardson P.C.

(57) ABSTRACT

An oven and a method of controlling the same are described. The oven is configured to perform a heat stage for implementing an air-fry. In this case, the oven may uniformly cook a cooking ingredient to be crispy by driving a convection fan earlier than a convection heater in at least some heating sections, adjusting a driving time of each of a broil heater and a convection heater and revolutions per minute (RPM) of the convection fan, and correcting a target temperature of a cooking chamber to be higher than a set temperature input by a user.

20 Claims, 12 Drawing Sheets

OVEN AND METHOD OF CONTROLLING THE SAME

CROSS-REFERENCE TO RELATED APPLICATION

This application claims priority to and the benefit of Korean Patent Application No. 10-2021-0003118, filed on Jan. 11, 2021, the disclosure of which is incorporated herein by reference in its entirety.

TECHNICAL FIELD

The present disclosure relates an oven which performs a heat stage for implementing an air-fry and a method of controlling the same.

BACKGROUND

An oven is a home electric appliance in which a cooking ingredient (food) is input to a cooking chamber formed in a cavity and which heats and cooks the input cooking ingredient. The oven for heating the cooking ingredient includes at least one heat source. In addition, the heat source is divided into a high-frequency heat source, a radiant heat source, a convection heat source, and the like according to a heating method. An operation of the heat source is controlled according to a kind of cooking ingredient, substantially, according to a recipe.

Meanwhile, an air-fry method is a cooking method of frying a cooking ingredient using a convection phenomenon of hot air without using oil. Accordingly, there is an advantage in that the air-fry method is more convenient than a frying cooking method using the conventional fry pan.

An air-fryer is a home electric appliance which heats a cooking ingredient in the air-fry method. In addition, recently, research on applying the air-fry method to an oven is being conducted.

FIG. 1 is a view for describing the conventional technology in which the air-fry method is applied to an oven.

FIG. 1 is a view extracted from FIG. 1 of a related art, and reference numerals assigned in FIG. 1 are limited to only components of FIG. 1.

Referring to FIG. 1, a kitchen range 10 according to the conventional technology cooks a cooking ingredient in an air-fry method and includes three heat sources, that is, a broil heater 16, a bake heater 18, and a convection heating system 20.

In the conventional technology of FIG. 1, after two or three pre-heat stages are performed, a post-heat stage is performed. In this case, before the post-heat stage is performed, the cooking ingredient is input to a cavity 12. Then, some heat sources among three heat sources are driven to perform the heat stage. In this case, the some heat sources are alternately or simultaneously driven.

However, in the conventional technology, since three heat sources are used, there is a disadvantage in that a control process is complex. In addition, since two or three pre-heat stages are performed, there is a disadvantage in that a cooking time is long. In addition, since a convection fan 24 included in the convection heating system 20 is driven at fixed revolutions per minute, there is a possibility of a time of the pre-heating stage increasing or a surface of the cooking ingredient burning.

SUMMARY

Technical Problems

The present disclosure is to providing an oven which uniformly heats a cooking ingredient in an air-fry method and a method of controlling the same.

In addition, the present disclosure is to providing an oven, which cooks a cooking ingredient in an air-fry method using a first heat source configured to generate radiant heat and a second heat source configured to generate convection heat, and a method of controlling the same.

In addition, the present disclosure is to providing an oven capable of quickly raising an internal temperature of a cooking chamber at an initial heat stage in an air-fry mode and a method of controlling the same.

In addition, the present disclosure is to providing an oven capable of uniformly transferring heat to a cooking chamber at a heat stage after an initial stage in an air-fry method and method of controlling the same.

Objectives of the present disclosure are not limited to the above-described objectives, and other objectives and advantages of the present disclosure may be understood by the following descriptions and clearly understood by embodiments of the present disclosure. In addition, it may be seen that the objectives and the advantages of the present disclosure may be made using elements and combinations thereof described in the appended claims.

Technical Solutions

An oven and a method of controlling the same in one embodiment may use only a first heat source configured to generate radiant heat and a second heat source configured to generate convection heat in order to implement an air-fry mode, and thus, simple control may be performed.

In addition, the oven and the method of controlling the same in one embodiment may uniformly cook a cooking ingredient by driving a convection fan earlier than driving of the convection heater to improve efficiency of a convection phenomenon in some heating sections in an air-fry mode.

In addition, the oven and the method of controlling the same in one embodiment may heat the cooking ingredient under optimal conditions by adjusting a driving time of the broil heater, a driving time of the convection heater, and a driving speed, that is, revolutions per minute (RPM), of the convection fan when the air-fry mode is performed.

In addition, the oven and the method of controlling the same in one embodiment may cook the cooking ingredient to be crispy by correcting a target temperature of a cooking chamber to be higher than a set temperature input by a user.

In addition, the oven and the method of controlling the same in one embodiment may uniformly cook any kind of cooking ingredient to be crispy by controlling the heat sources in different methods for meat and non-meat when the air-fry mode is performed.

An oven in one embodiment may include a cavity in which a cooking chamber is formed, a broil heater disposed on the cooking chamber and configured to generate radiant heat toward an inner portion of the cooking chamber, and a convection module including a convection fan and a convection heater and configured to supply hot wind into the cooking chamber, wherein the heat stage includes a first heat stage, a second heat stage, and a third heat stage which are sequentially performed, a cooking ingredient is input to the cooking chamber before the first heat stage is performed, in each of the first, second, and third heat stages, the broil heater and the convection heater are driven alternatively, a driving time of the broil heater in the first heat stage is longer than a driving time of the broil heater in each of the second and third heat stages, and in the first heat stage, the convection fan is driven first before the convection heater is driven.

In this case, output power of the broil heater may be higher than output power of the convection heater.

In each of the first, second, and third heat stages, the broil heater and the convection module may be driven in a cycle having a preset time section, and the convection heater may be driven after the broil heater is driven first.

In the cycle of the first heat stage, the convection fan may be driven at first RPM higher than preset reference RPM.

In the cycle of the first heat stage, the driving time of the broil heater may be the same as a driving time of the convection heater, and in the cycle of each of the second and third heat stages, the driving time of the broil heater may be shorter than a driving of the convection heater.

Driving of the broil heater and driving of the convection module when a set temperature for cooking the cooking ingredient is higher than a preset reference temperature may be different from driving of the broil heater and driving of the convection module when the set temperature is lower than or equal to the reference temperature. In this case, the reference temperature may be set based on a temperature necessary for cooking meat.

A driving time of the convection fan in the cycle in the first heat stage when the set temperature is higher than the reference temperature may be longer than a driving time of the convection fan in the cycle in the first heat stage when the set temperature is less than or equal to the reference temperature.

When the set temperature is higher than the reference temperature, the convection fan may be driven in the cycle of the second heat stage at first RPM higher than preset reference RPM and may be driven in the cycle of the third heat stage at second RPM lower than the reference RPM.

When the set temperature is higher than the reference temperature, in the cycle of the second heat stage, the convection fan may be driven first before the convection heater is driven.

When the set temperature is lower than or equal to the reference temperature, in each of the second and third heat stages, there may be an idle section between driving of the broil heater and driving of the convection heater, and the cooking ingredient may be cooked by heat remaining in the cooking chamber in the idle section.

The oven may further include a sensor configured to detect an internal temperature of the cooking chamber and a controller configured to control the broil heater and the convection module to be driven.

In this case, the controller may correct the detected internal temperature and control the broil heater and the convection module so that the corrected internal temperature reaches a set temperature for cooking the cooking ingredient, and when the corrected internal temperature reaches the set temperature, the detected internal temperature may be higher than the set temperature.

A method of controlling a oven including a broil heater, a convection module, and a controller in one embodiment may include, inputting a cooking ingredient to a cooking chamber, performing a first heat stage by alternately driving the broil heater and the convection heater, performing a second heat stage by alternately driving the broil heater and the convection heater, and performing a third heat stage by alternately driving the broil heater and the convection heater, wherein a driving time of the broil heater in the first heat stage is longer than a driving time of the broil heater in each of the second and third heat stages, and in the performing of the first heat stage, the convection fan is driven first before the convection heater is driven.

Advantageous Effects

According to the present disclosure, the oven may heat the food in an air-fry manner.

According to the present disclosure, in at least a part of the operation section of the air-fry mode, a convection fan is driven before a convection heater, an operation time of a broil heater and the convection heater is adjusted, a rpm of the convection fan is adjusted, and a target temperature of a cooking chamber is corrected to be higher than a set temperature input by a user, thereby the food being cooked uniformly and crisply.

According to the present disclosure, both meat and non-meat may be cooked uniformly and crisply when the air-fry mode is performed.

According to the present disclosure, by simply controlling the first heating source configured to generate radiant heat and a second heat source configured to generate convection heat, thereby being possible to prevent malfunction of the oven.

Specific effects are described along with the above-described effects in the section of Detailed Description.

BRIEF DESCRIPTION OF DRAWINGS

The above and other objects, features, and advantages of the present disclosure will become more apparent to those of ordinary skill in the art by describing exemplary embodiments thereof in detail with reference to the accompanying drawings, in which.

DETAILED DESCRIPTION

Figure 1:
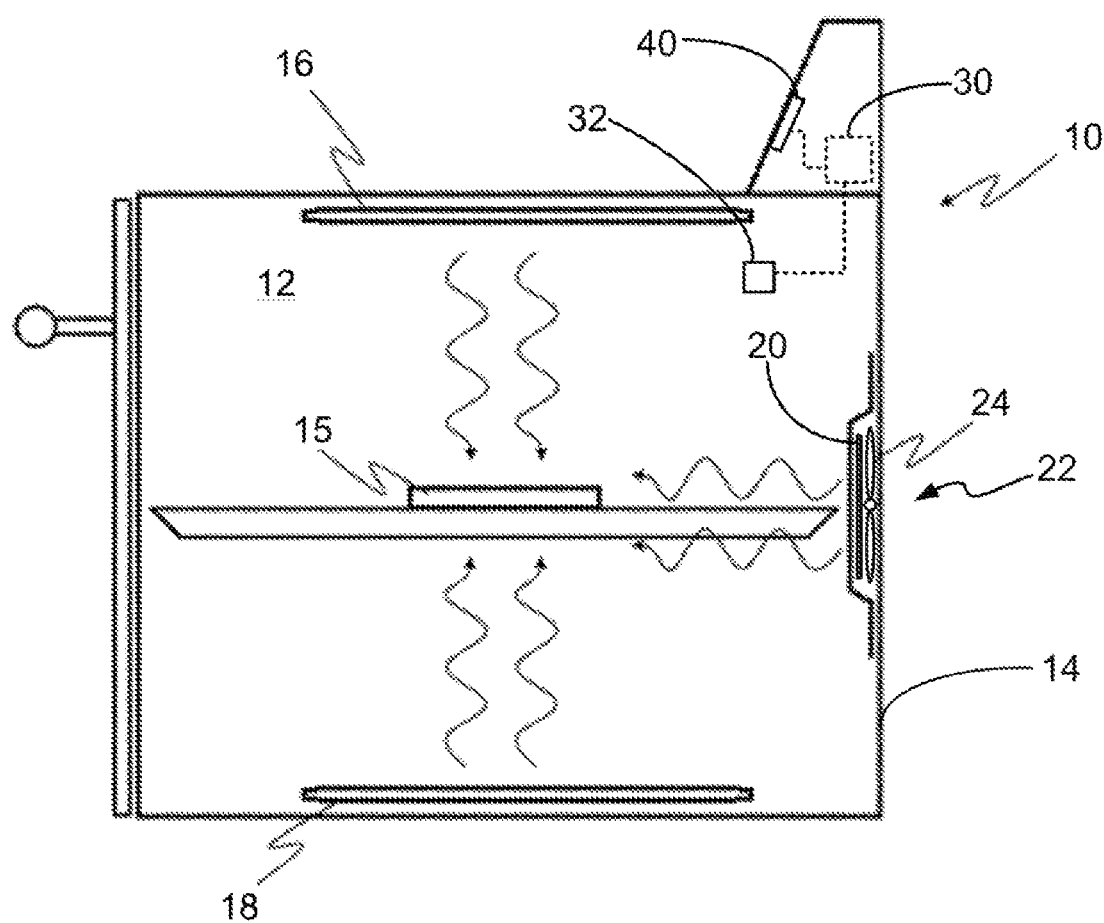
FIG. 1 is a view for describing a conventional technology in which an air-fry method is applied to an oven.

The above-described purposes, features, and advantages will be described in detail with reference to the accompanying drawings, and thus the technical spirit of the present disclosure may be easily executed by those skilled in the art. In describing the present disclosure, when the detailed descriptions of well-known technologies related to the present disclosure unnecessarily obscure the gist of the invention, the detailed descriptions will be omitted. Hereinafter, exemplary embodiments of the present disclosure will be described in detail with reference to the accompanying drawings. The same or similar elements are denoted by the same reference numerals in the drawings.

Although terms such as first, second, or the like may be used for describing various elements, the elements are not limited to the terms. The terms are only used to distinguish one element from another element, and unless otherwise specifically described, a first element may also be a second element.

Hereinafter, a case in which an arbitrary element is disposed "above (or under)" or "on (or below)" an element may include a case in which the arbitrary element is disposed to be in contact with an upper (or lower) surface of the element, or a case in which still another element may be interposed between the element and the arbitrary element disposed above (or under) the element.

Throughout the specification, unless specifically described otherwise, the number of elements may be one or a plurality.

The singular forms used in the present specification are intended to include the plural forms as well, unless the context clearly indicates otherwise. It should be interpreted that the term "comprises" or "includes," when used herein, do not necessarily include all components or various operations stated in the specification and may not include some components and operations therein or may further include additional components and operations.

Hereinafter, an oven according to some embodiments of the present disclosure will be described.

Figure 2:
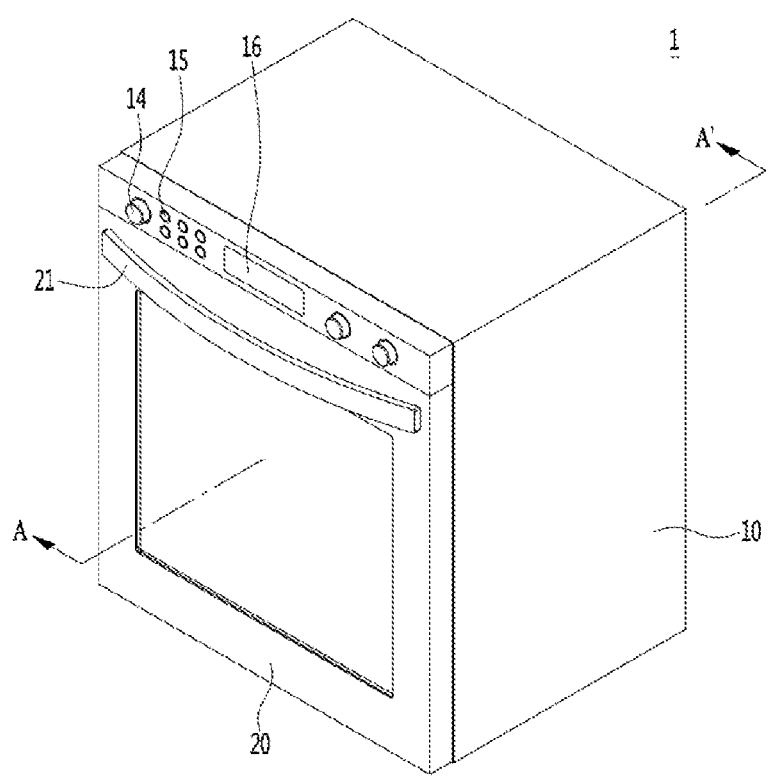
FIGS. 2 and 3 are perspective views illustrating an oven according to one embodiment of the present disclosure.
Figure 3:
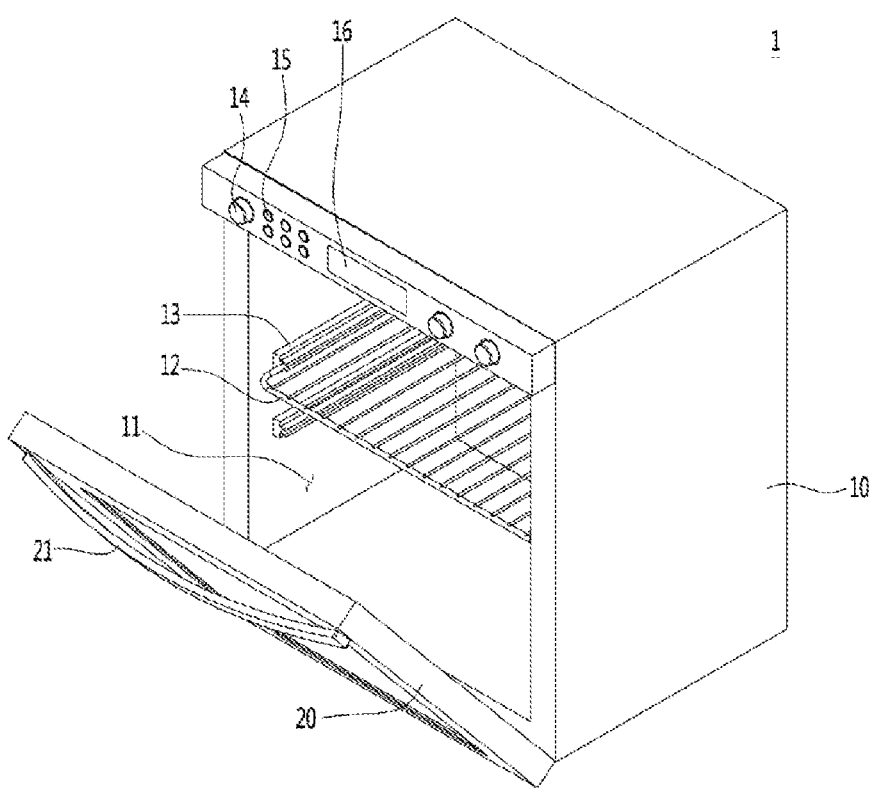
Figure 4:
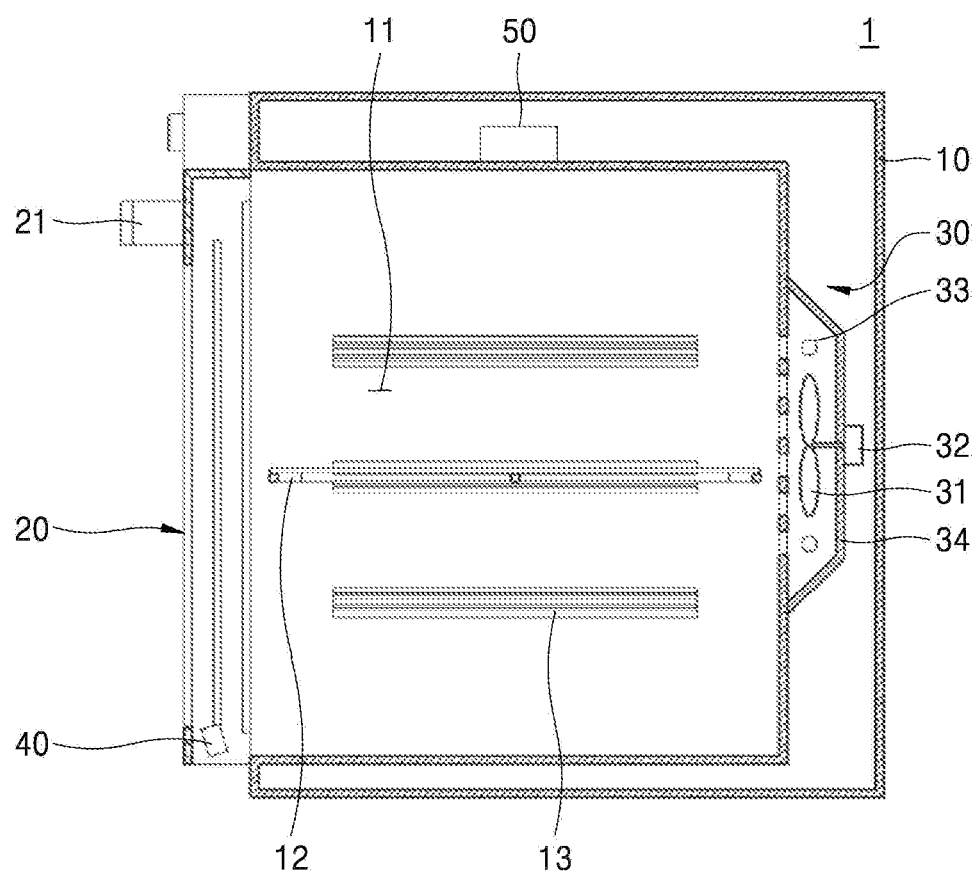
FIG. 4 is a cross-sectional view taken along line A-A' of FIG. 2.

FIGS. 2 and 3 are perspective views illustrating an oven 1 according to one embodiment of the present disclosure. FIG. 4 is a cross-sectional view taken along line A-A' of FIG. 2.

For the sake of convenience in the description, in FIGS. 2 to 4, a structure of the oven 1 is simply illustrated. In addition, in FIG. 2, the oven 1, of which a door is closed, is illustrated, and in FIG. 3, the oven 1, of which the door is opened, is illustrated.

Referring to FIGS. 2 to 4, the oven 1 according to one embodiment of the present disclosure includes a case 10 and a door 20 attached to one surface of the case 10.

The case 10 is provided in a shape having an inner space, and the front of the case 10 is open. As an example, the case 10 may be formed in a predetermined box shape.

A cooking chamber 11 in which a cooking ingredient is cooked is formed in the case 10. Grills 12 on which the cooking ingredient is loaded are provided in the cooking chamber 11. In addition, grill installation parts 13 may be provided on an inner wall of the cooking chamber 11. The grills 12 may be detachably installed on the grill installation parts 13. The numbers and shapes of the grills 12 and the grill installation parts 13 may vary.

A plurality of heat sources for cooking the cooking ingredient may be installed inside the cavity 10 and outside the cooking chamber 11. The heat sources include a convection module 30 and a broil heater 50.

The convection module 30 provides hot air, that is, hot wind, into the cooking chamber 11. The provided hot air circulates the cooking chamber 11, and thus, convection heat is generated in the cooking chamber 11.

The convection module 30 includes a convection fan 31, a convection motor 32, and a convection heater 33. The convection fan 31, the convection motor 32, and the convection heater 33 are installed in the convection module 30 defined by a convection cover 34 provided on one surface of the cavity 10.

The convection fan 31 moves air in the cooking chamber 11. The convection motor 32 provides a driving force for rotating the convection fan 31. The convection heater 33 generates heat. The heat generated by the convection heater 33 is supplied to the cooking chamber 11 using the convection fan 31.

Meanwhile, in FIG. 4, the convection module 30 is illustrated as being installed on a rear surface of the cavity 10 corresponding to a back surface of the cooking chamber 11, but an installation position of the convection module 30 is not limited thereto. As an example, the convection module 30 may also be installed on at least one of the rear surface and two side surfaces of the cavity 10 corresponding to the back surface and the two side surfaces of the cooking chamber 11.

The broil heater 50 is disposed on the cooking chamber 11 and generates radiant heat to be supplied into the cooking chamber 11. The broil heater 50 may be any one among a carbon heater, a halogen heater, a ceramic heater, and a sheath heater.

Meanwhile, generally, output power of the broil heater 50 is greater than output power of the convection heater 33. As an example, the output power of the broil heater 50 may be 4200 W, and the output power of the convection heater 33 may be 2500 W.

Various heat sources may be further provided in addition to the convection module 30 and the broil heater 50. As an example, the heat sources may include a magnetron. The magnetron is a high-frequency heat source which generates microwaves toward an inner portion of the cooking chamber 11.

A power supply part 14, an input part 15, and a display part 16 are provided at an outer side of the case 10.

The power supply part 14 may be formed in one of various shape allowing a user to turn a power source of the oven 1 on and off.

The input part 15 is provided as a plurality of buttons so that the user selects one of various operations modes, a set temperature, an operation time, and the like. In this case, the set temperature is a temperature input by the user for cooking the cooking ingredient.

The display part 16 displays predetermined information so that the user checks a state of the oven 1.

The door 20 is installed at an open front surface of the case 10 and disposed to open or close the cooking chamber 11. That is, the cooking chamber 11 may be opened or closed by the door 20. For the sake of convenience in the description, the door 20 is illustrated in the drawings in which a configuration related to an installation structure, a locking device, and the like of the door 20 is omitted.

As illustrated in FIG. 3, the door 20 is installed at the front surface of the case 10 to be rotatable forward. In addition, a handle 21, which may be grasped and rotated by the user, may be provided on the door 20.

Meanwhile, although not illustrated in FIGS. 2 to 4, a temperature sensor (not shown) may be further installed in the cooking chamber 11. The temperature sensor measures a temperature in the cooking chamber 11, that is, an internal temperature of the cooking chamber 11. The measured internal temperature is transmitted to a controller which will be described below. As an example, the temperature sensor may be a thermostat.

Meanwhile, the oven 1 illustrated in FIGS. 2 to 4 is exemplary, and components may be omitted therefrom or added thereto.

Figure 5:
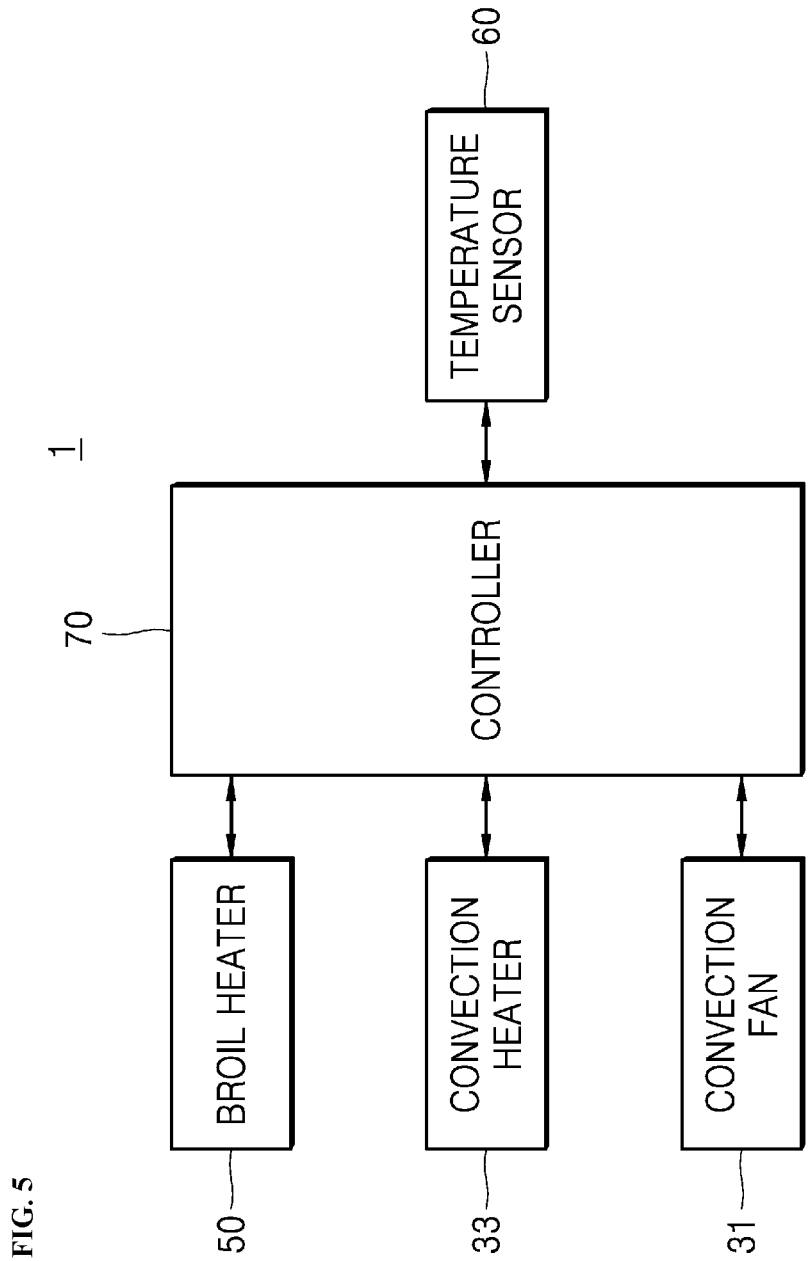
FIG. 5 is a control block diagram of the oven according to one embodiment of the present disclosure.

FIG. 5 is a control block diagram of the oven 1 according to one embodiment of the present disclosure.

Referring to FIG. 5, the oven 1 includes a controller 70.

The controller 70 may be a device based on a processor. In this case, the processor may include one or more among a central processing unit, an application processor, and a communication processor. The processor may control at least one of other components of the oven 1 and/or execute calculation related to communication or data processing. As an example, the controller 70 may be a microcomputer.

The controller 70 controls the convection fan 31, the convection heater 33, and the broil heater 50 to be driven. Meanwhile, since the convection fan 31 is driven by the convection motor 32, the term "control of the convection fan 31" should be understood as the same meaning as the term "control of the convection motor 32."

The controller 70 receives an internal temperature of the cooking chamber 11 from a temperature sensor 60. The controller 70 compares a set temperature input by the user for a cooking ingredient with the internal temperature to control driving of each of the convection fan 31, the convection heater 33, and the broil heater 50. As an example, the controller 70 may control the convection fan 31, the convection heater 33, and the broil heater 50 to be driven so that the internal temperature reaches the set temperature.

Meanwhile, the user may cook a cooking ingredient in one of various operation modes. Particularly, the operation modes may include an air-fry mode. As illustrated above, the air-fry mode is a cooking mode in which the cooking ingredient is fried through using convection phenomenon of hot air without using oil.

Hereinafter, an operation of the oven 1 performing the air-fry mode will be described in more detail with reference to FIGS. 6 to 12.

Figure 6:
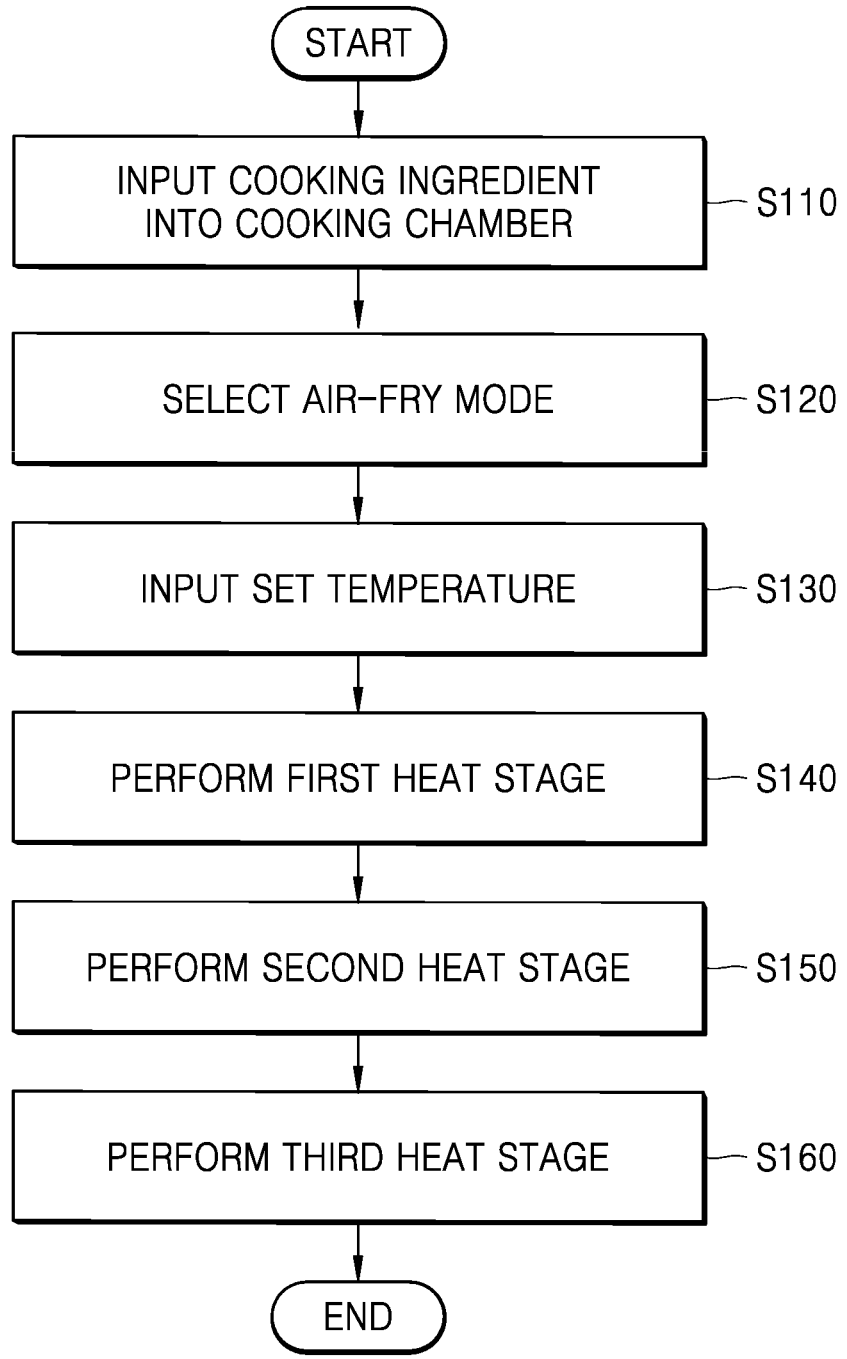
FIG. 6 is a flowchart illustrating a method of controlling the oven according to one embodiment of the present disclosure.

FIG. 6 is a flowchart illustrating a method of controlling the oven according to one embodiment of the present disclosure.

The method of controlling the oven illustrated in FIG. 6 corresponds to an operation of the oven performing the air-fry mode.

Meanwhile, in the air-fry mode, pre-heating is not performed as will be described below. The pre-heating is a heat stage of raising an internal temperature of the cooking chamber 11 in a state in which a cooking ingredient is not disposed in the cooking chamber 11. In addition, cooking or post-heating is a heat stage of heating the cooking ingredient in a state in which the cooking ingredient is disposed in the cooking chamber 11.

Hereinafter, operations performed in each step will be described in detail.

In operation S110, a cooking ingredient is input to the cooking chamber 11.

That is, the cooking ingredient is seated on the grill 12 installed in the cooking chamber 11 of the cavity 10.

In operation S120, the user sets the air-fry mode through the input part 15.

In operation S130, the user inputs a set temperature through the input part 15.

The set temperature is a temperature necessary for cooking the cooking ingredient. Generally, a set temperature is equal to a target temperature of a cooking chamber 11, but in the present disclosure, the set temperature is a temperature different from a target temperature. This will be described in detail below.

Meanwhile, the set temperature may vary according to a kind of cooking ingredient. As an example, the set temperature for meat (including meat with bones) may be higher than a set temperature for a processed food such as a nugget.

A first heat stage is performed in operation S140, a second heat stage is performed in operation S150, and a third heat stage is performed in operation S150. That is, in the air-fry mode, the oven 1 sequentially performs the first heat stage, the second heat stage, and the third heat stage.

The first heat stage, the second heat stage, and the third heat stage are post-heat stages. Particularly, since the cooking ingredient is input to the cooking chamber before the first heat stage is performed, the first heat stage and the second heat stage are not the pre-heat stage and are the post-heat stages. Accordingly, the oven 1 does not perform the pre-heat stage in the air-fry mode.

In addition, in each of the first heat stage, the second heat stage, and the third heat stage, the broil heater 50 and the convection heater 33 are alternately driven. In this case, the broil heater 50 is driven first, and then, the convection heater 33 is driven. In this case, a driving time of the broil heater 50 does not overlap a driving time of the convection heater 33.

In addition, in each of the first heat stage, the second heat stage, and the third heat stage, the broil heater 50 and the convection module 30 are driven in each cycle having a predetermined time section. In this case, in each cycle, the broil heater 50 and the convection heater 33 are sequentially and individually driven. The cycle may have one of various time sections. As an example, a time section of the cycle may be 60 seconds, but the present disclosure is not limited thereto.

Meanwhile, different post-heat stages of the oven may be performed based on set temperatures. That is, when the set temperature is greater than a preset reference temperature, the first heat stage may be performed, and when the set temperature is lower than the reference temperature, the second heat stage different from the first heat stage may be performed.

In this case, the reference temperature may be set based on a temperature necessary for cooking meat. As an example, the reference temperature may be 435° F. However, the present disclosure is not limited thereto.

Hereinafter, the first heat stage and the second heat stage will be described in detail with reference to FIGS. 7 to 12. Here, a case, in which the set temperature is lower than the reference temperature, that is, a case in which non-meat is cooked, is referred to as a "first case," and a case, in which the set temperature is greater than the reference temperature, that is, a case in which meat is cooked, is referred to as a "second case."

Figure 7:
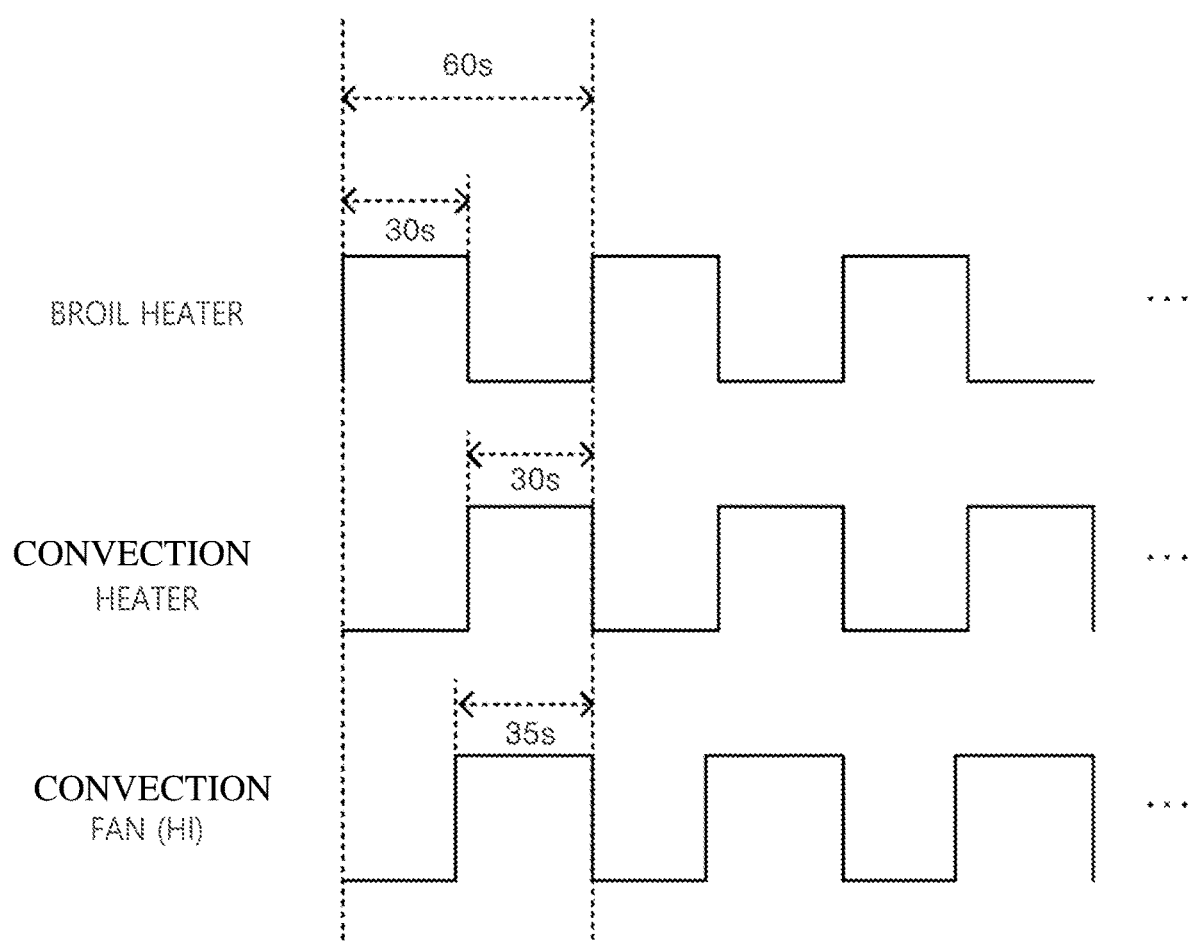
FIGS. 7 to 9 are time diagrams of a broil heater, a convection heater, and a convection fan in a first case according to one embodiment of the present disclosure.
Figure 8:
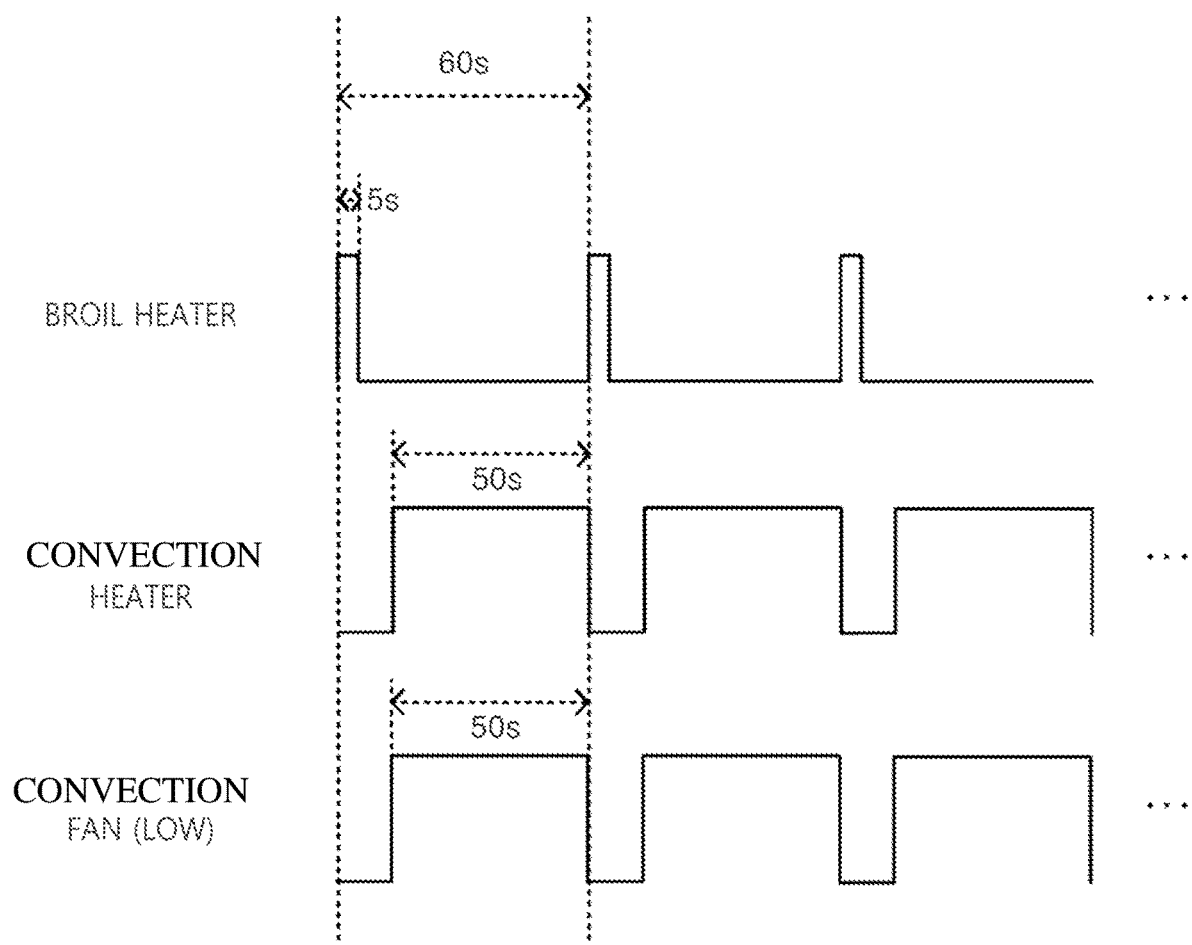
Figure 9:
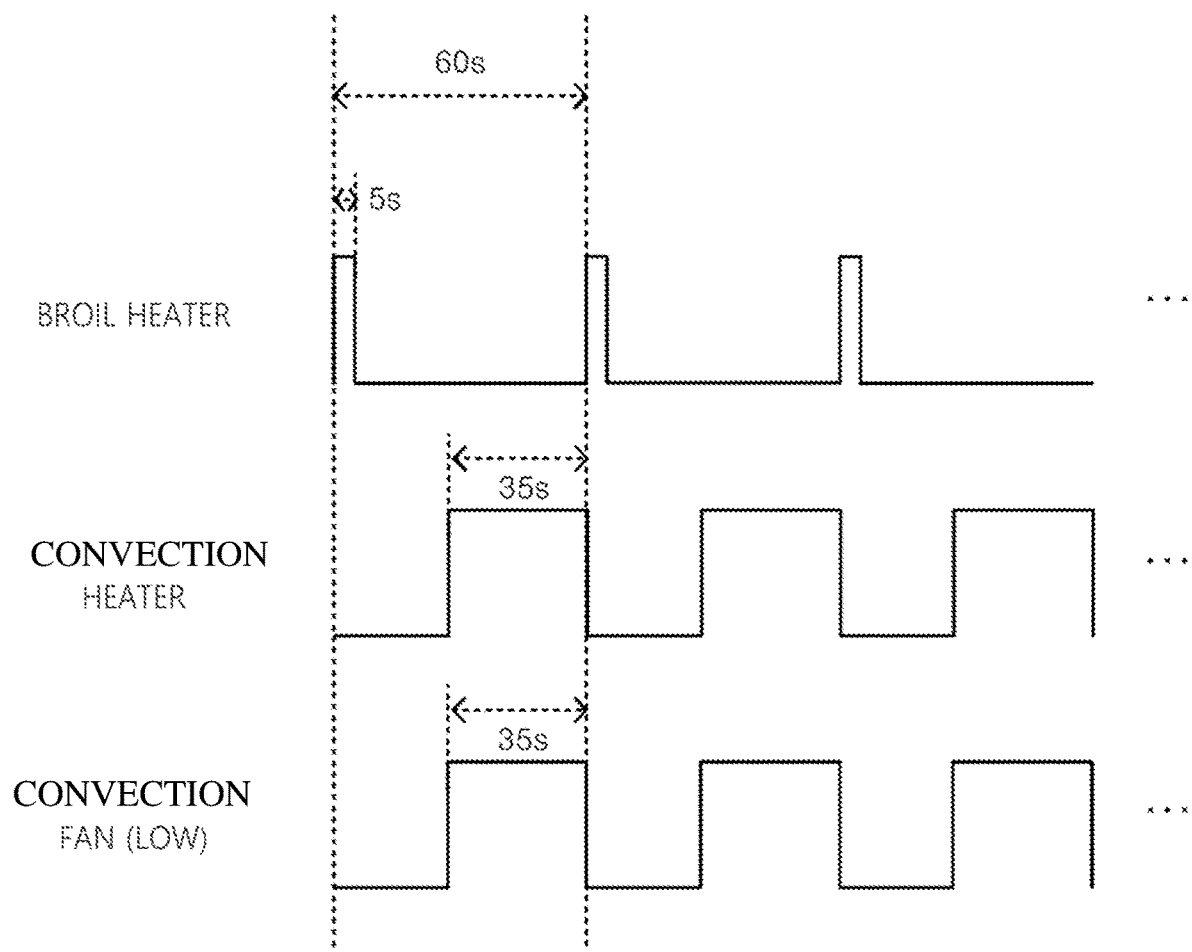

FIGS. 7 to 9 are time diagrams of the broil heater 50, the convection heater 33, and the convection fan 31 in the first case according to one embodiment of the present disclosure. In this case, it is assumed that a time interval of the cycle is 60 seconds.

First, in each of the cycles of operation S130 in the first case, the broil heater 50, the convection heater 33, and the convection fan 31 are driven as illustrated in FIG. 7.

More specifically, the broil heater 50 is driven (that is, turned on) for 30 seconds from a start time point of the cycle. The convection heater 33 is driven for 30 seconds after the broil heater 50 is driven completely.

The convection fan 31 is driven first for 35 seconds before the convection heater 33 is driven. That is, a starting time point of the convection fan 31 is earlier than a driving start time point of the convection heater 33, and a driving stop time point of the convection fan 31 is the same as a driving stop time point of the convection heater 33. In addition, the convection fan 31 is driven at first revolutions per minute (RPM) (high) which is higher than preset reference RPM. As an example, the first RPM may be 1700 RPM, but the present disclosure is not limited thereto.

In short, the first heat stage performed in operation S130 in the first case is a stage for quickly raising an internal temperature of the cooking chamber 11. To this end, the broil heater 50 having high output power is driven for a longer time, the convection fan 31 is driven earlier than driving of the convection motor 32 to increase a convection effect of internal air, and the convection fan 31 is driven to be fast. The meaning of "the broil heater 50 is driven for a longer time" may be understood to be that a driving time of the broil heater 50 in the first heat stage is longer than a driving time of the broil heater 50 in each of the second and third heat stages which will be described below. In addition, the driving time of the broil heater 50 is set to be the same as a driving time of the convection heater 33.

Next, in each of the cycles of operation S140 in the first case, the broil heater 50, the convection heater 33, and the convection fan 31 are driven as illustrated in FIG. 8.

More specifically, the broil heater 50 is driven for 5 seconds from a start time point of the cycle. The convection heater 33 is driven for 50 seconds after the broil heater 50 is driven completely. There is an idle section for 5 seconds between the driving of the broil heater 50 and the driving of the convection heater 33.

The convection fan 31 and the convection heater 33 are simultaneously driven for 50 seconds. In addition, the convection fan 31 is driven at second RPM (low) which is lower than the preset reference RPM. As an example, the second RPM may be 1100 RPM, but the present disclosure is not limited thereto.

In short, the second heat stage performed in operation S140 in the first case is a stage for uniformly transferring heat in the cooking chamber 11. To this end, the broil heater 50 is driven for a shorter time, and the convection heater 33 is driven for a longer time. That is, a driving time of the broil heater 50 is shorter than a driving time of the convection heater 33. The meaning of "the broil heater 50 is driven for a shorter time" may be understood to be that the driving time of the broil heater 50 in the second heat stage is shorter than the driving time of the broil heater 50 in the first heat stage.

In addition, there is the idle section between the driving of the broil heater 50 and the driving of the convection heater 33, the cooking ingredient is cooked by heat remaining in the cooking chamber 11, that is, cooked by residual heat of the broil heater 50 which is driven completely. In addition, the convection fan 31 is driven slowly. This may be performed because the set temperature is lower than or equal to the reference temperature.

Subsequently, in each of the cycles of operation S150 in the first case, the broil heater 50, the convection heater 33, and the convection fan 31 are driven as illustrated in FIG. 9.

More specifically, the broil heater 50 is driven for 5 seconds from a start time point of the cycle. The convection heater 33 is driven for 35 seconds after the broil heater 50 is driven completely. There is an idle section for 20 seconds between the driving of the broil heater 50 and the driving of the convection heater 33. The convection fan 31 and the convection heater 33 are simultaneously driven for 35 seconds. The convection fan 31 is driven at the second RPM.

In short, the third heat stage performed in operation S150 in the first case is a main heat stage in the air-fry mode performed using convection heat. To this end, the broil heater 50 is driven for a shorter time, and the convection heater 33 is driven for a longer time. That is, a driving time of the broil heater 50 is shorter than a driving time of the convection heater 33. In addition, there is the idle section between the driving of the broil heater 50 and the driving of the convection heater 33, and the cooking ingredient is cooked by a residual heat of the broil heater 50 which is driven completely. In addition, the convection fan 31 is driven slowly.

Meanwhile, in first, second, and third heat stages, the target temperature of the cooking chamber 11 input by the user may be corrected to be higher than the set temperature input by the user. This is for cooking a surface of the cooking ingredient crispier.

To this end, the controller 70 may correct an internal temperature detected by the temperature sensor 60 and control the broil heater 50 and the convection module 30 so that the corrected internal temperature reaches the set temperature. In this case, when the corrected internal temperature reaches the set temperature, the target temperature which is the detected internal temperature may be higher than the set temperature.

According to one embodiment of the present disclosure, the controller 70 may calculate the corrected internal temperature by substituting the detected internal temperature into a predefined equation. This may be described by the following Equation 1.

$$Tc = 1.1 To - 20 \text{(first and second heat stages)}$$

$$Tc = 1.0 To - 15 \text{(third heat stage)} \quad \text{[Equation 1]}$$

Here, To denotes a detected internal temperature, and Tc is a corrected internal temperature.

Figure 10:
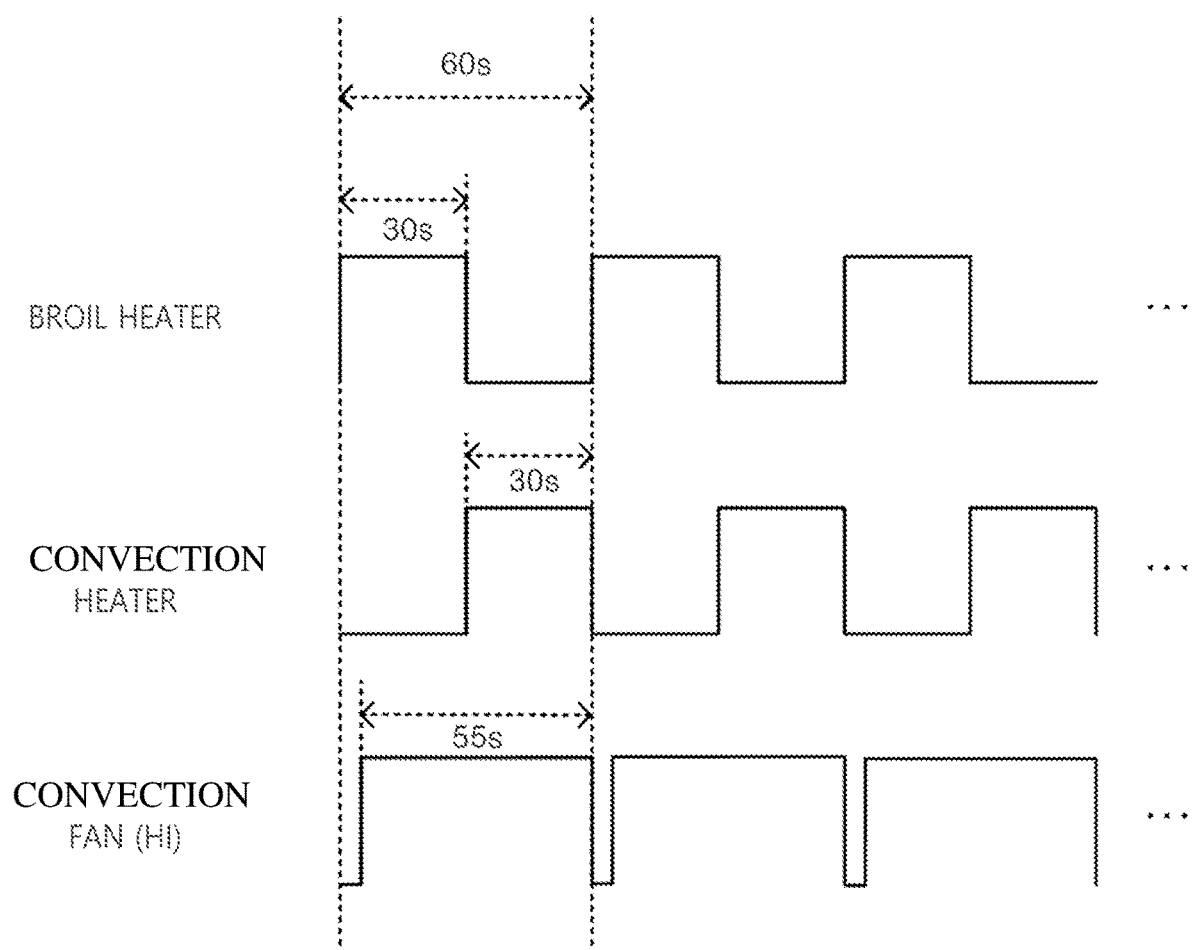
FIGS. 10 to 12 are time diagrams of the broil heater, the convection heater, and the convection fan in a second case according to one embodiment of the present disclosure.
Figure 11:
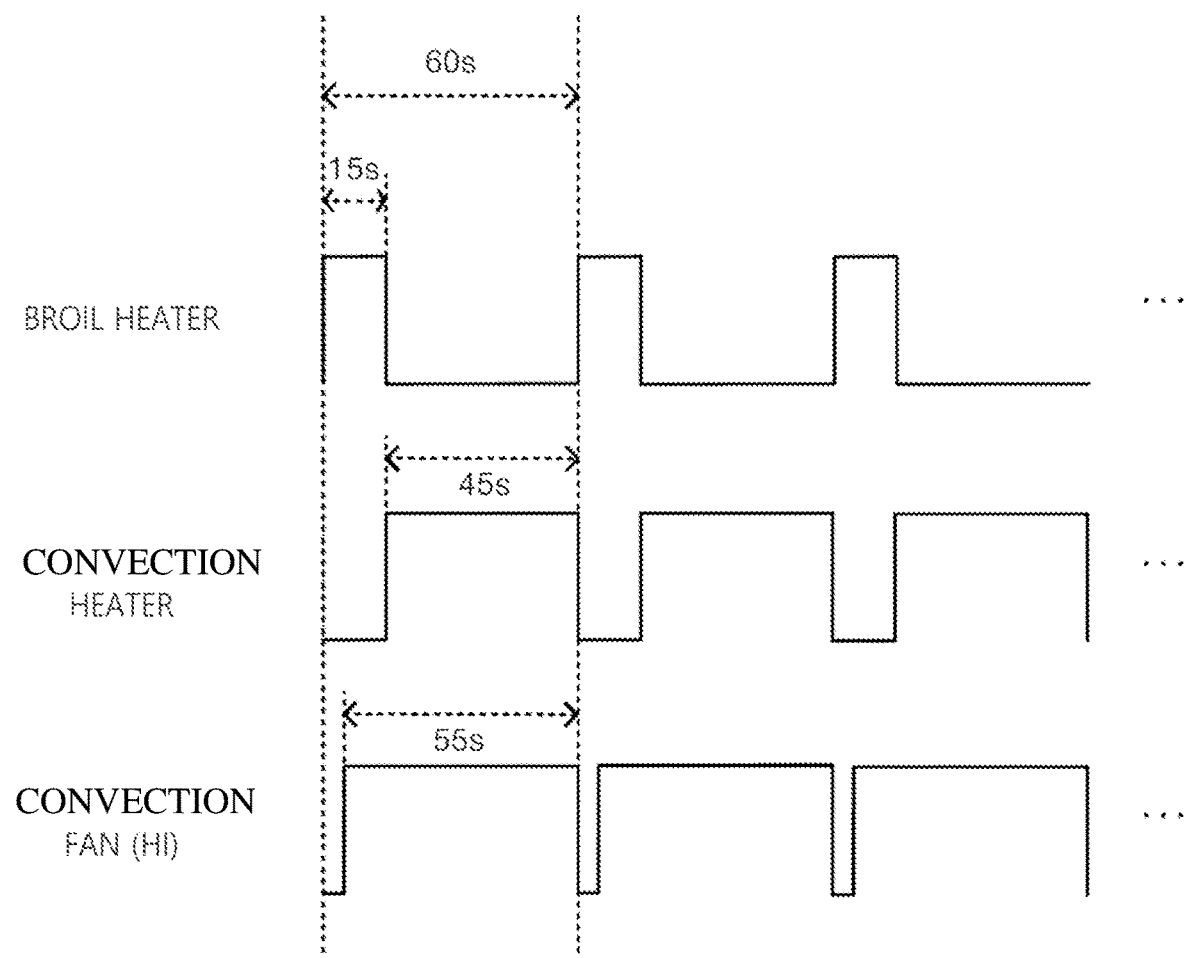
Figure 12:
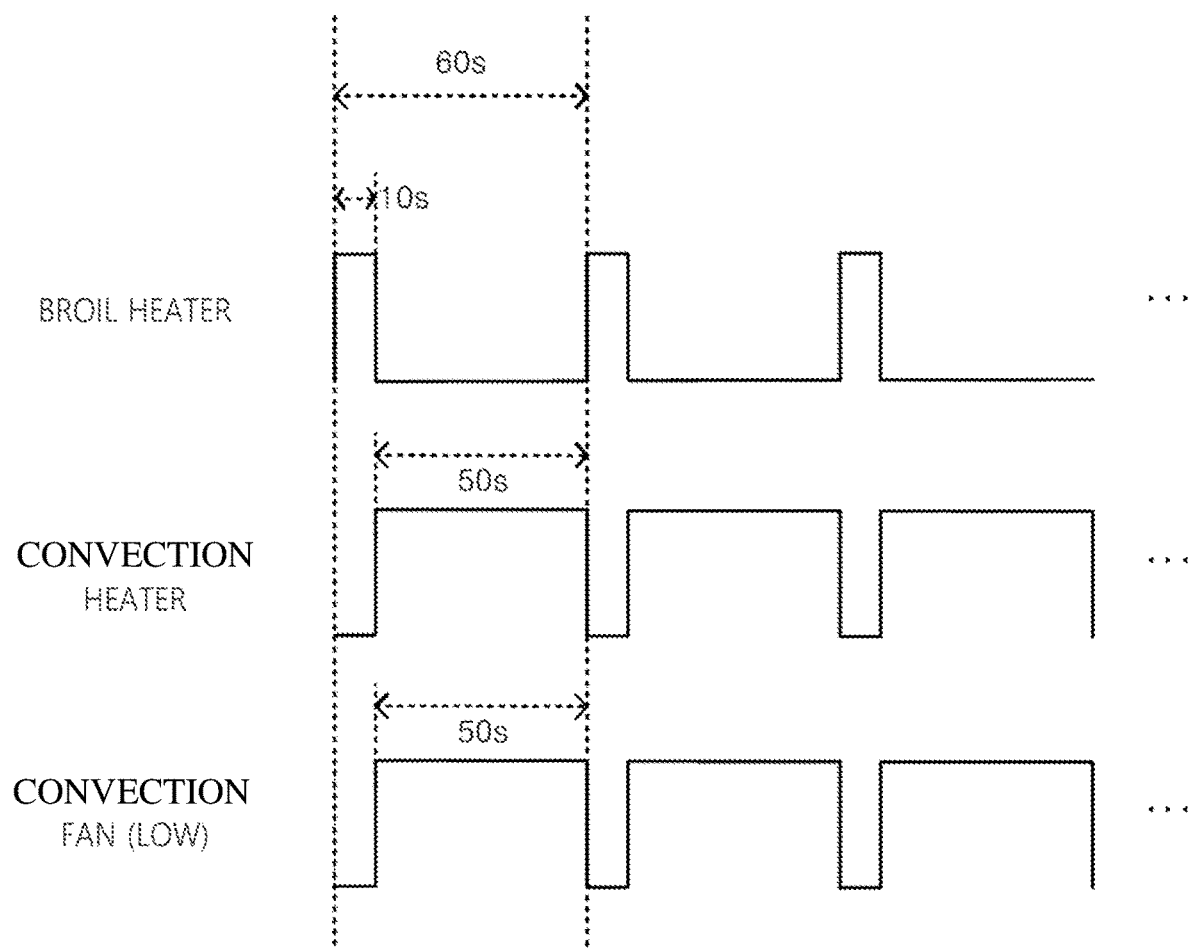

FIGS. 10 to 12 are time diagrams of the broil heater 50, the convection heater 33, and the convection fan 31 in the second case according to one embodiment of the present disclosure. In this case, it is assumed that a time interval of a cycle is 60 seconds.

First, in each of the cycles of operation S130 in the second case, the broil heater 50, the convection heater 33, and the convection fan 31 are driven as illustrated in FIG. 10.

More specifically, the broil heater 50 is driven for 30 seconds from a start time point of the cycle. The convection heater 33 is driven for 30 seconds after the broil heater 50 is driven completely. The convection fan 31 is driven for 55 seconds before the convection heater 33 is driven. The convection fan 31 is driven at the first RPM.

In short, the first heat stage performed in operation S130 in the second case is a stage for quickly raising an internal temperature of the cooking chamber 11. To this end, the broil heater 50 having the high output power is driven for a longer time, the convection fan 31 is driven earlier than driving of the convection motor 32 in order to improve a convection effect, and the convection fan 31 is driven to be fast. In addition, a driving time of the broil heater 50 is set to be the same as a driving time of the convection heater 33.

In addition, in the second case, a set temperature is higher than the set temperature of the first case. Accordingly, in order to further raise the internal temperature, a driving time of the convection fan 31 in the second case may be longer than the driving time of the convection fan 31 in the first case.

Next, in each of the cycles of operation S140 in the second case, the broil heater 50, the convection heater 33, and the convection fan 31 are driven as illustrated in FIG. 11.

More specifically, the broil heater 50 is driven for 15 seconds from a start time point of the cycle. The convection heater 33 is driven for 45 seconds after the broil heater 50 is driven completely. The convection fan 31 is driven for 55 seconds before the convection heater 33 is driven. The convection fan 31 is driven at the second RPM.

In short, the second heat stage performed in operation S140 in the second case is a stage for uniformly transferring heat in the cooking chamber 11. In addition, the set temperature in the second case is higher than the set temperature in the first case. Accordingly, the broil heater 50 is driven for a shorter time, the convection heater 33 is driven for a longer time, the convection fan 31 is driven at the first RPM, and the convection fan 31 is driven earlier than driving of the convection heater 33.

Subsequently, in each of the cycles of operation S150 in the second case, the broil heater 50, the convection heater 33, and the convection fan 31 are driven as illustrated in FIG. 12.

More specifically, the broil heater 50 is driven for 10 seconds from a start time point of the cycle. The convection heater 33 is driven for 50 seconds after the broil heater 50 is driven completely. The convection fan 31 and the convection heater 33 are simultaneously driven for 50 seconds. The convection fan 31 is driven at the second RPM.

In short, the third heat stage performed in operation S150 in the second case is a main heat stage in the air-fry mode using convection heat. In addition, the set temperature in the second case is higher than the set temperature in the first case. Accordingly, the broil heater 50 is driven for a shorter time, the convection heater 33 is driven for a longer time, and a driving time of each of the broil heater 50, the convection heater 33, and the convection fan 31 is longer than that in the first case.

Meanwhile, as described above, in each of the first, second, and third heat stages, the target temperature in the cooking chamber 11 may be corrected to be higher than the set temperature input by the user.

According to one embodiment of the present disclosure, the controller 70 may calculate the corrected internal temperature by substituting the detected internal temperature into a predefined equation. This may be described by the following Equation 2.

$$Tc = 1.1To - 55 \text{ (first and second heat stages)}$$

$$Tc = 1.0To - 50 \text{ (third heat stage)} \quad \text{[Equation 2]}$$

Here, To denotes a detected internal temperature, and Tc denotes a corrected internal temperature.

In short, the oven 1 according to one embodiment of the present disclosure uses only the first heat source configured to generate radiant heat and the second heat source configured to generate convection heat in order to perform the air-fry mode. Accordingly, since a high-frequency heat source, a bake heater, and the like are not used, simple control may be performed.

In addition, in the oven 1 according to one embodiment of the present disclosure, as the convection fan 31 is driven earlier than driving of the convection heater 33 in at least some heating sections in the air-fry mode, efficiency of the convection phenomenon is improved so that the cooking ingredient may be uniformly cooked.

In addition, when the oven 1 according to one embodiment of the present disclosure operates in the air-fry mode, the cooking ingredient may be heated under optimal conditions by adjusting a driving time of each of the broil heater 50 and the convection heater 33 and adjusting a driving speed, that is, RPM, of the convection fan 31. In FIGS. 7 to 12, an optimal driving time of each of the broil heater 50, the convection heater 33, and the convection fan 31 is illustrated, and this may be summarized in a table below.

TABLE 1

| | First Case | | | Second Case | | |
|---|---|---|---|---|---|---|
| | Broil Heater (s) | Convection Heater (s) | Convection Fan (s) | Broil Heater (s) | Convection Heater (s) | Convection Fan (s) |
| First Heat Stage | 30 | 30 | 35 (HI) | 30 | 30 | 55 (HI) |
| Second Heat Stage | 5 | 50 | 50 (LO) | 15 | 45 | 55 (HI) |
| Third Heat Stage | 5 | 35 | 35 (LO) | 10 | 50 | 50 (LO) |

In addition, the oven 1 according to one embodiment of the present disclosure may cook the cooking ingredient to be crispy by correcting the target temperature in the cooking chamber to be higher than the set temperature input by the user.

In addition, the oven 1 according to one embodiment of the present disclosure may cook any kind of cooking ingredient to be crispy by controlling the heat sources, that is, the broil heater 50 and the convection module 30, in different manners for meat and non-meat when performing the air-fry mode.

In addition, while all components constituting the embodiments of the invention have been described as being combined into one unit or operated in a combined manner, the invention is not necessarily limited thereto, and at least one of the components may be selectively combined and operated within the scope of the invention. In addition, although all of the components may each be implemented as a single independent hardware, some or all components may also be selectively combined and implemented as a computer program having a program module that performs some or all functions combined in a single hardware device or a plurality of hardware devices. Codes and code segments constituting the computer program may be easily inferred by those skilled in the art. Such a computer program may be stored in computer readable media and read and executed by a computer, and thus the embodiment of the invention may be implemented. Computer program recording media include storage media including magnetic recording media, optical recording media, and semiconductor recording media. In addition, the computer program, which implements the embodiments of the present disclosure, includes a program module transmitted in real time through an external apparatus.

While the present disclosure has been described with reference to specific details such as detailed components, these are provided only to facilitate overall understanding of the invention, and the invention is not limited thereto and may be variously modified and changed by those skilled in the art. Therefore, the spirit and scope of the invention are defined not by the detailed description of the invention but by the appended claims, and encompasses all modifications and equivalents that fall within the scope of the appended claims.

What is claimed is:

1. An oven comprising:
 a case that defines a cooking chamber;
 a broil heater configured to generate radiant heat toward the cooking chamber; and
 a convection module comprising a convection heater configured to heat air and a convection fan configured to supply the air heated by the convection heater into the cooking chamber,
 wherein the oven is configured to operate in an air-fry mode based on performing a plurality of heat stages, the plurality of heat stages comprising a first heat stage, a second heat stage, and a third heat stage that are configured to be sequentially performed,
 wherein the oven is configured to:
  receive a cooking ingredient in the cooking chamber before performing the first heat stage,
  in the first heat stage, drive the convection fan before driving the convection heater,
  drive the broil heater and the convection heater alternately in each of the first heat stage, the second heat stage, and the third heat stage,
  drive the broil heater for a first driving time in the first heat stage,
  drive the broil heater for a second driving time in the second heat stage, and
  drive the broil heater for a third driving time in the third heat stage, and
 wherein the first driving time of the broil heater is longer than each of the second driving time of the broil heater and the third driving time of the broil heater.

2. The oven of claim 1, wherein the broil heater is configured to output power that is greater than output power of the convection heater.

3. The oven of claim 1, wherein the oven is configured to, in each of the first heat stage, the second heat stage, and the third heat stage:
 drive the broil heater and the convection module in a plurality of cycles, each of the plurality of cycles having a preset time section; and
 in each of the plurality of cycles, drive the convection heater after driving the broil heater.

4. The oven of claim 3, wherein the oven is configured to, in the plurality of cycles of the first heat stage, drive the convection fan at a first revolutions per minute (RPM) that is greater than a preset reference RPM.

5. The oven of claim 4, wherein the oven is configured to:
 in each of the plurality of cycles of the first heat stage, drive the broil heater for a first driving duration that is equal to a first driving duration of the convection heater;

in each of the plurality of cycles of the second heat stage, drive the broil heater for a second driving duration that is shorter than a second driving duration of the convection heater; and
 in each of the plurality of cycles of the third heat stage, drive the broil heater for a third driving duration that is shorter than a third driving duration of the convection heater.

6. The oven of claim 3, wherein the oven is configured to:
 drive the broil heater and the convection module according to a first driving setting based on a set temperature for cooking the cooking ingredient being higher than a reference temperature; and
 drive the broil heater and the convection module according to a second driving setting different from the first driving setting based on the set temperature being lower than or equal to the reference temperature.

7. The oven of claim 6, wherein the reference temperature is preset based on a temperature for cooking meat.

8. The oven of claim 6, wherein the oven is configured to, in each of the plurality of cycles of the first heat stage:
 drive the convection fan for a first duration based on the set temperature being higher than the reference temperature; and
 drive the convection fan for a second duration based on the set temperature being less than or equal to the reference temperature, the first duration being greater than the second duration.

9. The oven of claim 6, wherein the oven is configured to, based on the set temperature being higher than the reference temperature:
 in each of the plurality of cycles of the second heat stage, drive the convection fan at a first revolutions per minute (RPM) that is greater than a preset reference RPM; and
 in each of the plurality of cycles of the third heat stage, drive the convection fan at a second RPM that is less than the preset reference RPM.

10. The oven of claim 9, wherein the oven is configured to, based on the set temperature being higher than the reference temperature, drive the convection fan before driving the convection heater in each of the plurality of cycles of the second heat stage.

11. The oven of claim 6, wherein the oven is configured to, based on the set temperature being lower than or equal to the reference temperature:
 in each of the second heat stage and the third heat stage, set an idle period between driving of the broil heater and driving of the convection heater such that the cooking ingredient is cooked by heat remaining in the cooking chamber during the idle period.

12. The oven of claim 1, further comprising:
 a sensor configured to detect an internal temperature of the cooking chamber; and
 a controller configured to control driving of each of the broil heater and the convection module.

13. The oven of claim 12, wherein the controller is configured to:
 determine a corrected internal temperature by adjusting the detected internal temperature; and
 control the broil heater and the convection module until the corrected internal temperature reaches a set temperature for cooking the cooking ingredient, the detected internal temperature being higher than the corrected internal temperature that has reached the set temperature.

14. The oven of claim 13, wherein the controller is configured to calculate the corrected internal temperature by applying the detected internal temperature to predefined equations, and
wherein the predefined equations include (i) a first equation configured to be applied based on the set temperature being higher than a preset reference temperature and (ii) a second equation configured to be applied based on the set temperature being lower than or equal to the preset reference temperature, the second equation being different from the first equation.

15. The oven of claim 14, wherein the first equation includes:
Tc=1.1To−20, which is applied in the first and second heat stages; and
Tc=1.0To−15, which is applied in the third heat stage,
where To denotes the detected internal temperature, and Tc denotes the corrected internal temperature.

16. The oven of claim 14, wherein the second equation includes:
Tc=1.1To−55, which is applied in the first and second heat stages; and
Tc=1.0To−50, which is applied in the third heat stage,
where To denotes the detected internal temperature, and Tc denotes the corrected internal temperature.

17. A method for controlling an oven, the oven including a case that defines a cooking chamber, a broil heater configured to generate radiant heat toward the cooking chamber, a convection module including a convection heater configured to heat air and a convection fan configured to supply the air heated by the convection heater into the cooking chamber, and a controller, the controller being configured to operate the oven in an air-fry mode based on performing a plurality of heat stages including a first heat stage, a second heat stage, and a third heat stage that are configured to be sequentially performed, the method comprising:
receiving a cooking ingredient in the cooking chamber before performing the first heat stage;
performing the first heat stage for a first driving time by alternately driving the broil heater and the convection heater;
performing the second heat stage for a second driving time by alternately driving the broil heater and the convection heater; and
performing the third heat stage for a third driving time by alternately driving the broil heater and the convection heater,
wherein the first driving time of the broil heater is longer than each of the second driving time of the broil heater and the third driving time of the broil heater, and
wherein performing of the first heat stage comprises driving the convection fan before the convection heater.

18. The method of claim 17, wherein performing each of the first heat stage, the second heat stage, and the third heat stage comprises:
driving the broil heater and the convection module in a plurality of cycles, each of the plurality of cycles having a preset time section; and
in each of the plurality of cycles, driving the convection heater after driving the broil heater.

19. The method of claim 18, further comprising:
in each of the plurality of cycles of the first heat stage, driving the convection fan at a first revolutions per minute (RPM) that is greater than a preset reference RPM.

20. The method of claim 18, further comprising:
driving the broil heater and the convection module according to a first driving setting based on a set temperature for cooking the cooking ingredient being higher than a reference temperature; and
driving the broil heater and the convection module according to a second driving setting different from the first driving setting based on the set temperature being lower than or equal to the reference temperature.

* * * * *